United States Patent
Harris et al.

(10) Patent No.: US 7,194,118 B1
(45) Date of Patent: Mar. 20, 2007

(54) SYSTEM FOR OPTICALLY SECTIONING AND MAPPING SURGICALLY EXCISED TISSUE

(75) Inventors: Duncan Harris, Webster, NY (US); James M. Zavislan, Pittsford, NY (US)

(73) Assignee: Lucid, Inc., Rochester, NY (US)

( * ) Notice: Subject to any disclaimer, the term of this patent is extended or adjusted under 35 U.S.C. 154(b) by 247 days.

(21) Appl. No.: 10/129,719

(22) PCT Filed: Nov. 10, 2000

(86) PCT No.: PCT/US00/30729

§ 371 (c)(1), (2), (4) Date: May 6, 2002

(87) PCT Pub. No.: WO01/35325

PCT Pub. Date: May 17, 2001

(51) Int. Cl.
*G06K 9/00* (2006.01)

(52) U.S. Cl. .................. 382/128; 600/407; 600/478

(58) Field of Classification Search .............. 382/128, 382/133, 134, 110, 284, 297; 359/384, 385, 359/388, 393, 398; 600/300, 407, 476, 478
See application file for complete search history.

(56) References Cited

U.S. PATENT DOCUMENTS

| | | | |
|---|---|---|---|
| 4,760,385 A | 7/1988 | Jansson et al. | |
| 5,034,613 A | 7/1991 | Denk et al. | 250/458.1 |
| 5,073,857 A | 12/1991 | Peters et al. | 382/133 |
| 5,120,953 A | 6/1992 | Harris | 250/227.2 |
| 5,161,053 A | 11/1992 | Dabbs | 359/384 |
| 5,192,980 A | 3/1993 | Dixon et al. | 356/326 |
| RE34,214 E * | 4/1993 | Carlsson et al. | 348/79 |
| 5,235,510 A | 8/1993 | Yamada et al. | 600/300 |
| 5,297,034 A | 3/1994 | Weinstein | 382/128 |
| 5,532,873 A | 7/1996 | Dixon | 359/388 |
| 5,532,874 A * | 7/1996 | Stein | 359/394 |
| 5,548,661 A | 8/1996 | Price et al. | 382/133 |
| 5,602,674 A | 2/1997 | Weissman et al. | 359/393 |
| 5,655,029 A * | 8/1997 | Rutenberg et al. | 382/133 |
| 5,677,966 A | 10/1997 | Doerrer et al. | 382/128 |
| 5,788,639 A | 8/1998 | Zavislan et al. | 600/476 |
| 5,793,969 A | 8/1998 | Kamentsky et al. | 709/213 |
| 5,796,861 A | 8/1998 | Vogt et al. | 382/128 |
| 5,836,877 A * | 11/1998 | Zavislan | 600/407 |
| 5,848,177 A | 12/1998 | Bauer et al. | 382/128 |
| 5,880,880 A | 3/1999 | Anderson et al. | 359/385 |

(Continued)

FOREIGN PATENT DOCUMENTS

WO WO 96/21938 * 7/1996

(Continued)

OTHER PUBLICATIONS

Gross, Kenneth G. et al., Mohs Surgery, Fundamentals and Techniques, 1999, pp. 49-89, 91-96.

(Continued)

*Primary Examiner*—Samir Ahmed
(74) *Attorney, Agent, or Firm*—Kenneth J. Lukacher

(57) ABSTRACT

A display (34) provides from digital images of an excised tissue specimen the orientation and location of tissue and regions of interest (cancers). Images of slices through excised specimen are obtained using a confocal microscope (10) to obtain confocal maps to provide a mosaic of images each of which corresponds to a different map element. A macroscopic image of significant map elements and high resolution images of selected elements are provided to locate and mark regions which are cancerous thereby assisting the surgeon to excise such regions.

32 Claims, 13 Drawing Sheets

U.S. PATENT DOCUMENTS

| | | | |
|---|---|---|---|
| 5,891,619 A | 4/1999 | Zakim et al. | 435/4 |
| 6,014,451 A | 1/2000 | Berry et al. | 382/110 |
| 6,031,930 A | 2/2000 | Bacus et al. | 382/133 |
| 6,049,622 A | 4/2000 | Robb et al. | 382/128 |
| 6,067,372 A | 5/2000 | Gur et al. | 382/128 |
| 6,078,681 A | 6/2000 | Silver | 382/133 |
| 6,101,265 A | 8/2000 | Bacus et al. | 382/133 |
| 6,187,289 B1 | 2/2001 | Richards-Kortum et al. | 424/9.8 |
| 6,208,374 B1 | 3/2001 | Clinch | 348/79 |
| 6,263,233 B1 | 7/2001 | Zavislan et al. | 600/476 |
| 6,272,235 B1 | 8/2001 | Bacus et al. | 382/133 |
| 6,330,106 B1 | 12/2001 | Greenwald et al. | 359/398 |
| 6,370,422 B1 * | 4/2002 | Richards-Kortum et al. | 600/478 |
| 6,411,434 B1 | 6/2002 | Eastman et al. | 359/398 |
| 6,493,460 B1 | 12/2002 | MacAulay et al. | 382/133 |
| 6,522,774 B1 | 2/2003 | Bacus et al. | |

FOREIGN PATENT DOCUMENTS

| | | |
|---|---|---|
| WO | WO 00/49392 | 8/2000 |
| WO | WO 00/55669 | 9/2000 |

OTHER PUBLICATIONS

Rajadhyaksha, M. et al., Confocal Laser Microscope Images Tissue In Vivo, Laser Focus World, Feb. 1997, pp. 119-127.

* cited by examiner

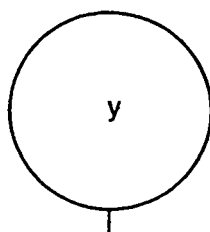

| User may click on composite image to reference a x,y location to move stage and display live image. User may move tissue about this location, change focal position, or change laser power. | — 96 |

| After reviewing image block the user can mark an image block as non-cancerous, cancerous, or uncertain. All image blocks are reviewed. Uncertain blocks are checked with live imaging. | — 96A |

| If the map button is clicked, go back and display composite map. | — 98 |

| Mapping is reactivated if any setting is changed. | — 98A |

FIG. 9C

SYSTEM FOR OPTICALLY SECTIONING AND MAPPING SURGICALLY EXCISED TISSUE

The present invention relates to systems for mapping surgically excised tissue specimens to correspond anatomically to the orientation of the excised tissue with respect to the patient from whom the tissue was removed, and particularly to a system for obtaining images by optical sectioning of a surgically excised tissue specimen and anatomically mapping these images.

In certain surgical procedures, particularly those where specimens are excised for the determination of cancerous tissue, such as in Moh's micrographic surgery, considerable surgical time is occupied by histopathology in order to provide numerous frozen sections through the specimen which are assembled to produce maps of the excision showing the cancerous regions. Typically, two to four slices are excised in Moh's surgery and there is a waiting time from 10 to 30 minutes for the surgeon and the patient while each slice is processed using conventional histopathologic techniques, and maps of the excised tissue obtained to guide the surgeon in the removal of the cancerous tissue with minimal damage to normal tissue.

It is the principal feature of this invention to utilize optical sectioning, especially with the aid of images obtained from confocal microscopy, to provide mapped images (anatomical maps) of the excised tissue specimen in a fraction of the time required by conventional histopathology thereby enabling the detection of cancers within minutes rather than hours.

Briefly, the system (which includes the method which carries out optical sectioning and mapping of surgically excised tissue specimens) may utilize a macroscopic imaging means for capturing a multi-spectral full field macroscopic image of the excised tissue which has been placed in a cassette marked with respect to the orientation of the excised tissue with respect to the patient. The imaging means captures images either by white light reflectance or fluorescopic imaging techniques or with confocal imaging means (see U.S. Pat. No. 5,788,639 or 5,880,880). A translation stage may be coupled to the cassette for moving it in orthogonal directions such that different parts of the specimen may be presented to the objective of the imaging means. The objective of the imaging means is translatable in a direction orthogonal to the directions of translation of the stage so as to image different slices on or within the specimen. A two-dimensional image block may be obtained by two-dimensional scanning of a beam on, or inside, the specimen. A map of the image blocks may be formed by scanning in a serpentine stepwise motion of the cassette with respect to the objective or vice versa. A single image block represents a map element. Each block is identified by a row and column in the bit map and the image of each block is digitally stored in memory and may have a pointer associated with each block. By compression, such as with a median filter, a compressed composite image is obtained and stored in memory. A mosaic of the map elements constitutes a full resolution image. A frame may have a group of these elements of the mosaic and thereby displays the image in high resolution sufficient for the physician to locate regions of interest, for example, containing cancerous cells. The composite image is a macroscopic image of compressed or reduced resolution, for example, one pixel per map element obtained by pixel elimination, mean-value-substitution or median filtering, the latter being preferred. A frame containing the composite, compressed image or selected blocks of the full resolution mosaic can be displayed either alternately or in different windows of a screen to the physician. The display shows those blocks in the region which are marked, as by a user interface or mouse, on the composite macroscopic image. At any time different slices may be displayed. The regions of the high resolution image may be marked by dots of different colors or patterns as may be defined in a look-up table, such as red for cancerous, green for non-cancerous and yellow for uncertain, on the display. The information appears on the macroscopic image as to the location of the potentially cancerous regions and may be used by the surgeon in making further excisions for removal of the cancerous cells. A complete two-dimensional image with the markings and the map all oriented with respect to the patient (the anatomic map) may be displayed, if desired. The images in any frame either of the composite or of the map elements from the mosaic may be printed out on a color printer, or the entire two-dimensional image may be displayed.

The foregoing and other features advantages and improvements provided by the invention as well as a preferred embodiment thereof will become more apparent from a reading of the following description in connection with the accompanying drawings and also in connection with International Publication WO 00/49392, published 24 Aug. 2000 of International Application PCT/US00/04070, claiming priority to U.S. Patent Application Ser. No. 60/120,534, filed 17 Feb. 1999, showing a cassette for an excised tissue specimen which may be suitable for use in practicing the invention, as well as mechanisms for handling the cassette and confocal images. The aforesaid International Publication also may be instructive with respect to the background of the invention, especially in connection with Moh's surgery. This publication is incorporated herein and made part hereof. Another International Publication WO 00/55669, published 21 Sep. 2000, is incorporated herein by reference. This publication is of International Application PCT/US00/07008, which claims priority to U.S. Patent Application Ser. No. 60/125,033, filed 18 Mar. 1999. The later International Publication describes confocal imaging means especially suitable for use in practicing the invention which uses cross-polarization and acetic acid to enhance imaging.

The drawings, briefly described, are as follows.

Figure 1:
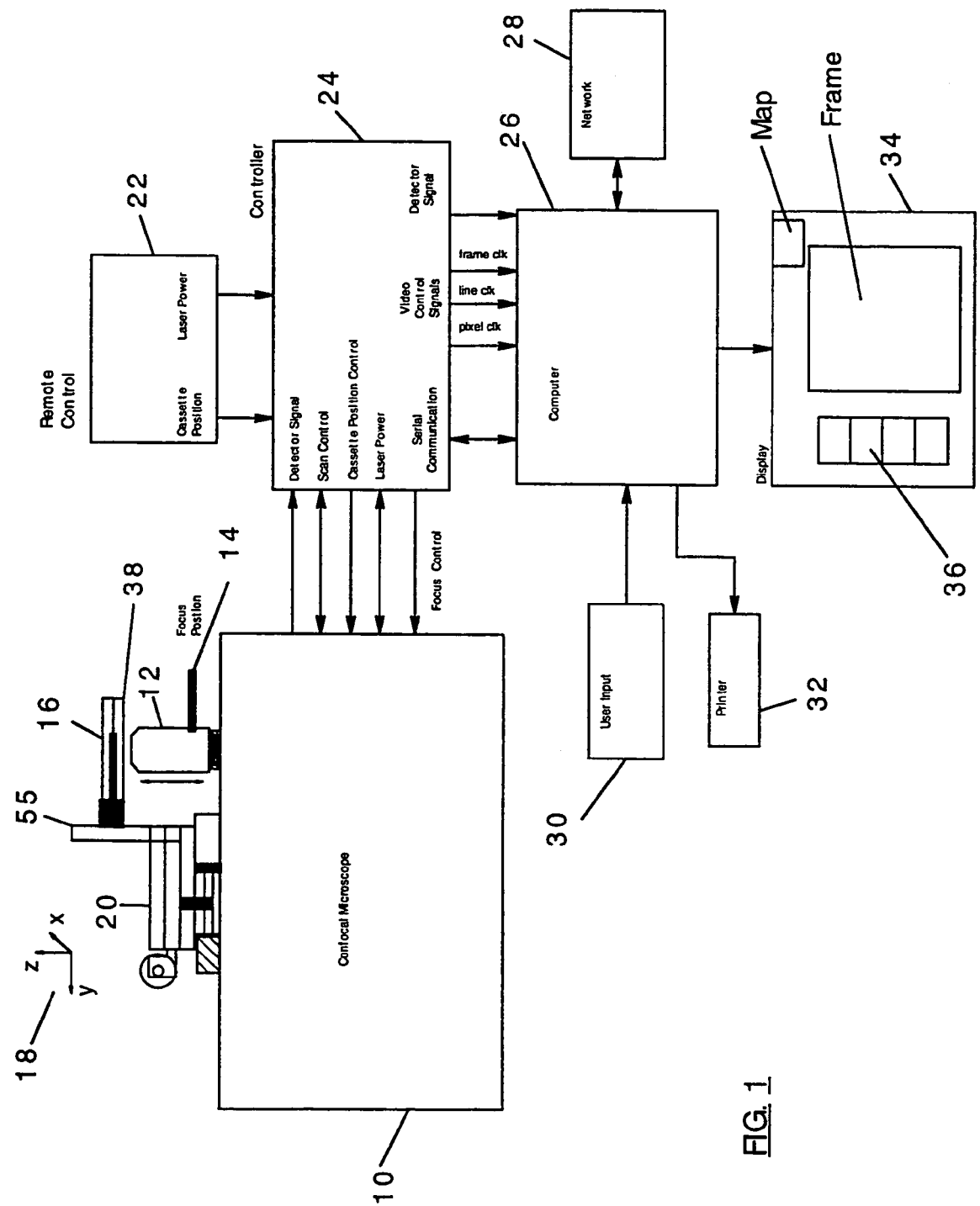
FIG. 1 is a block diagram of a system for optically sectioning and mapping surgically excised tissue, which embodies the invention.
Figure 7:
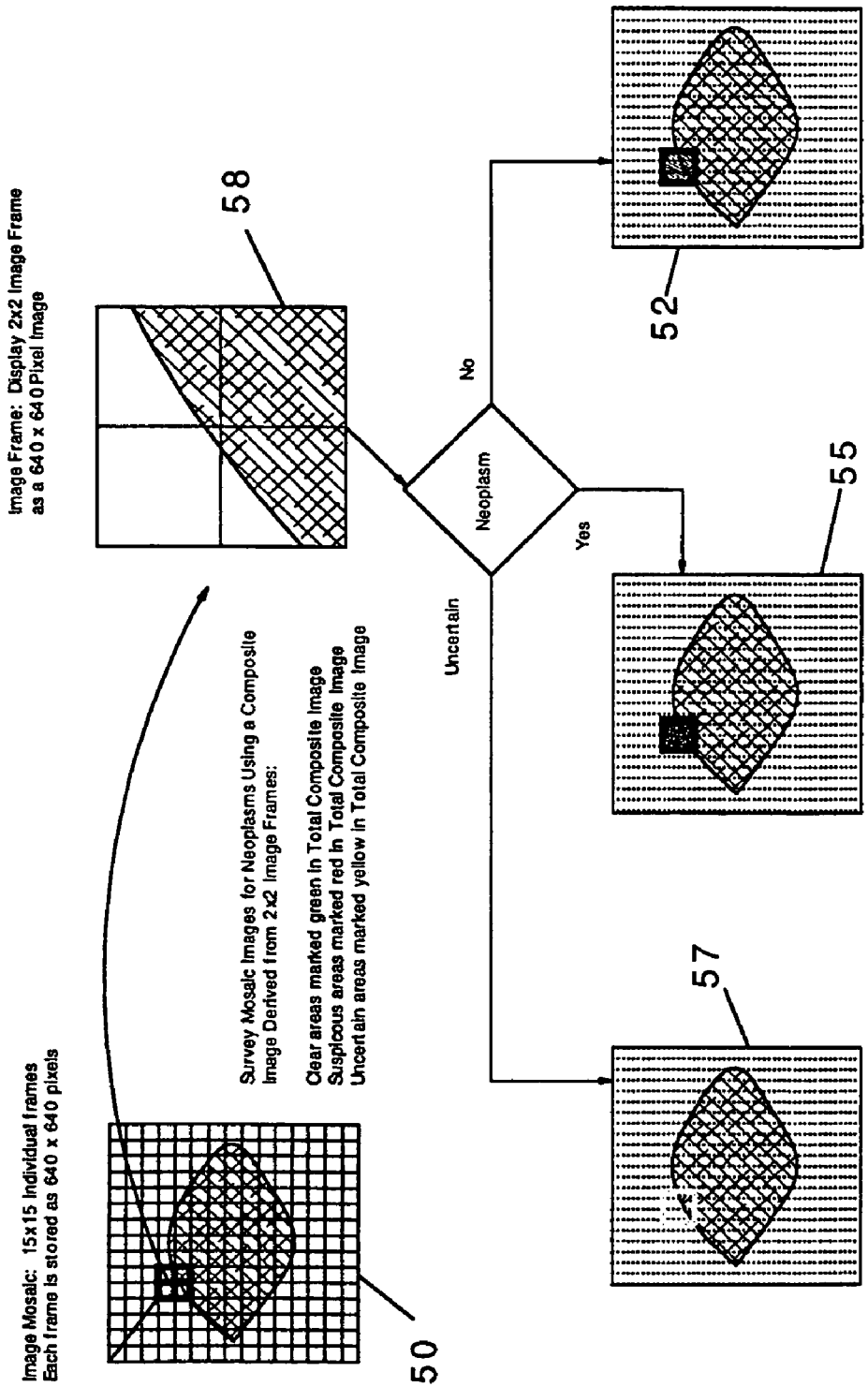
Figure 8:
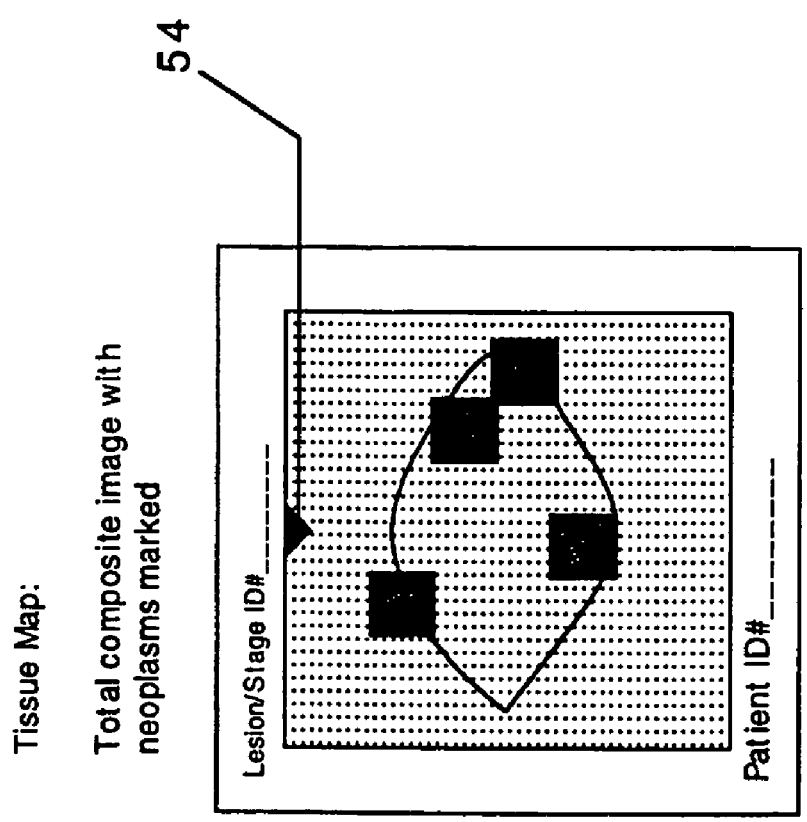
Figure 9A:
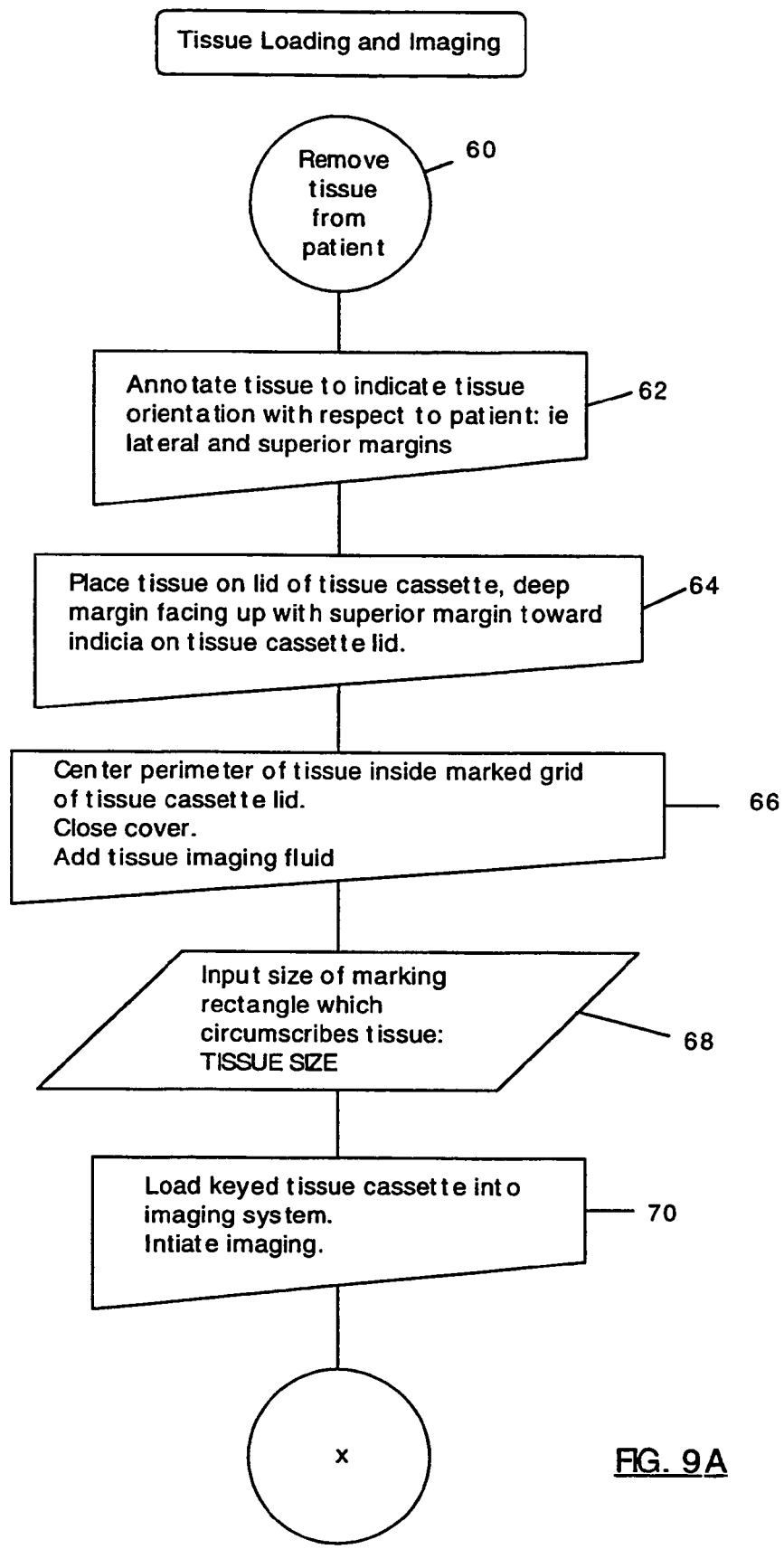
Figure 9B:
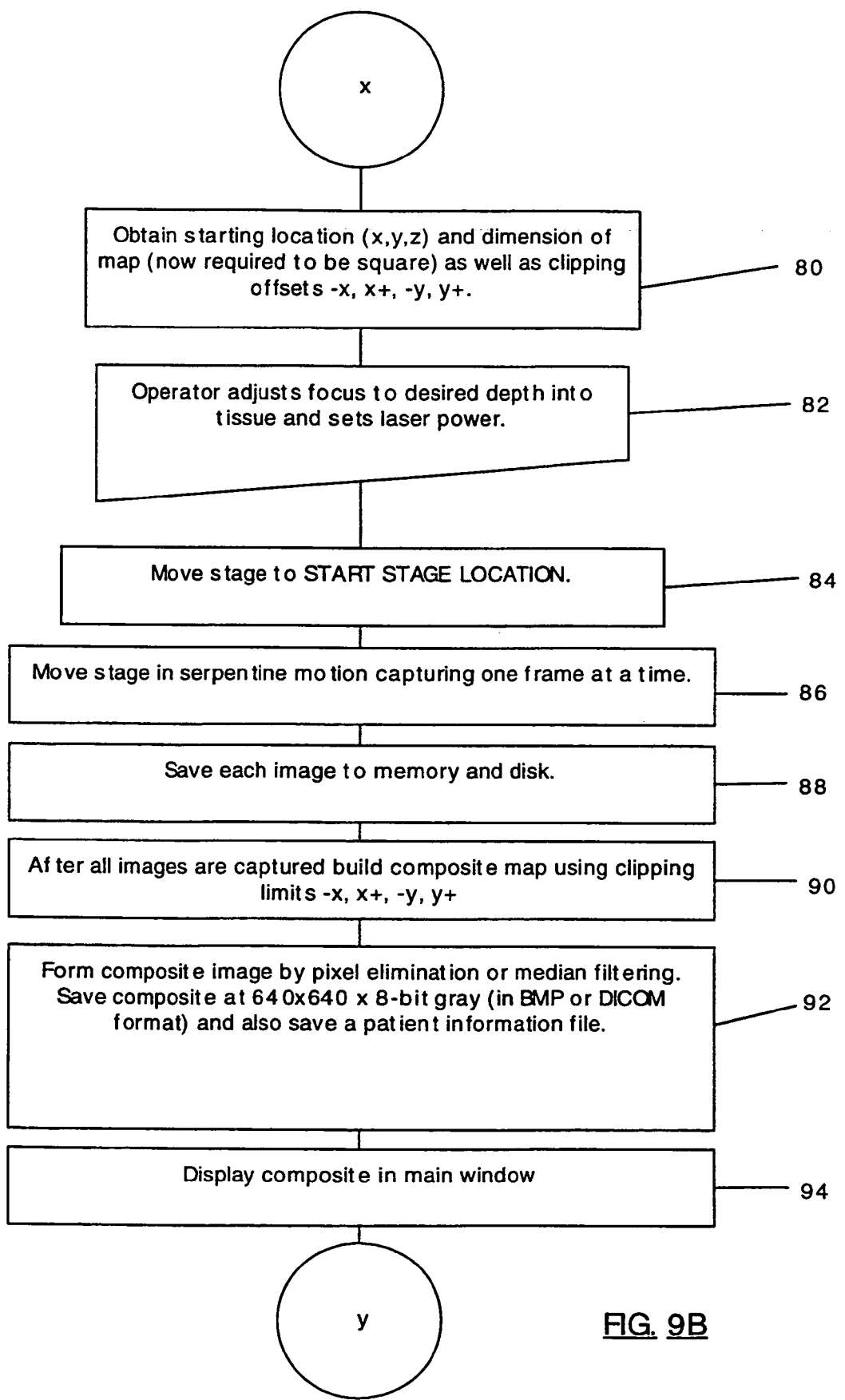
Figure 10:
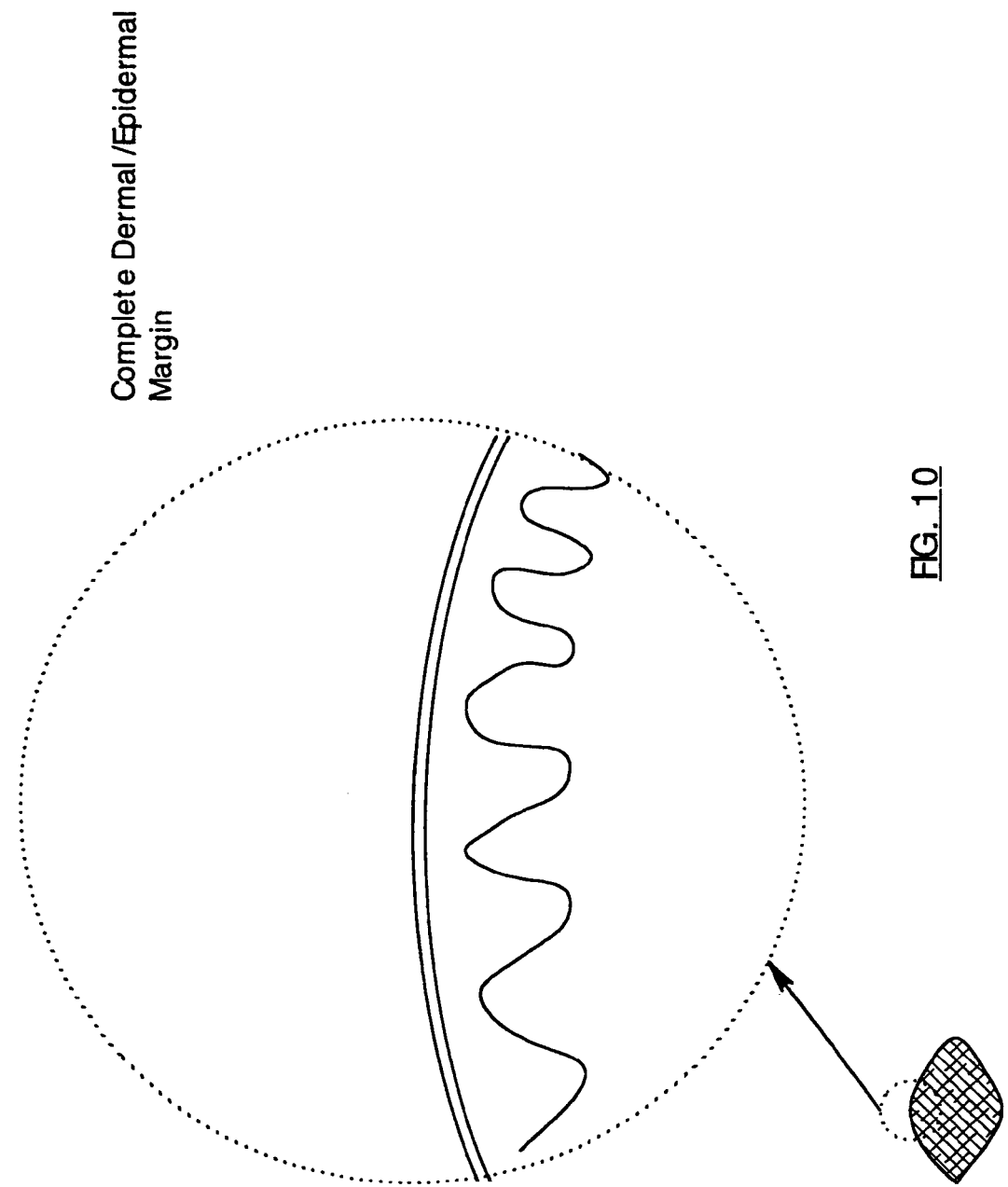
Figure 11:
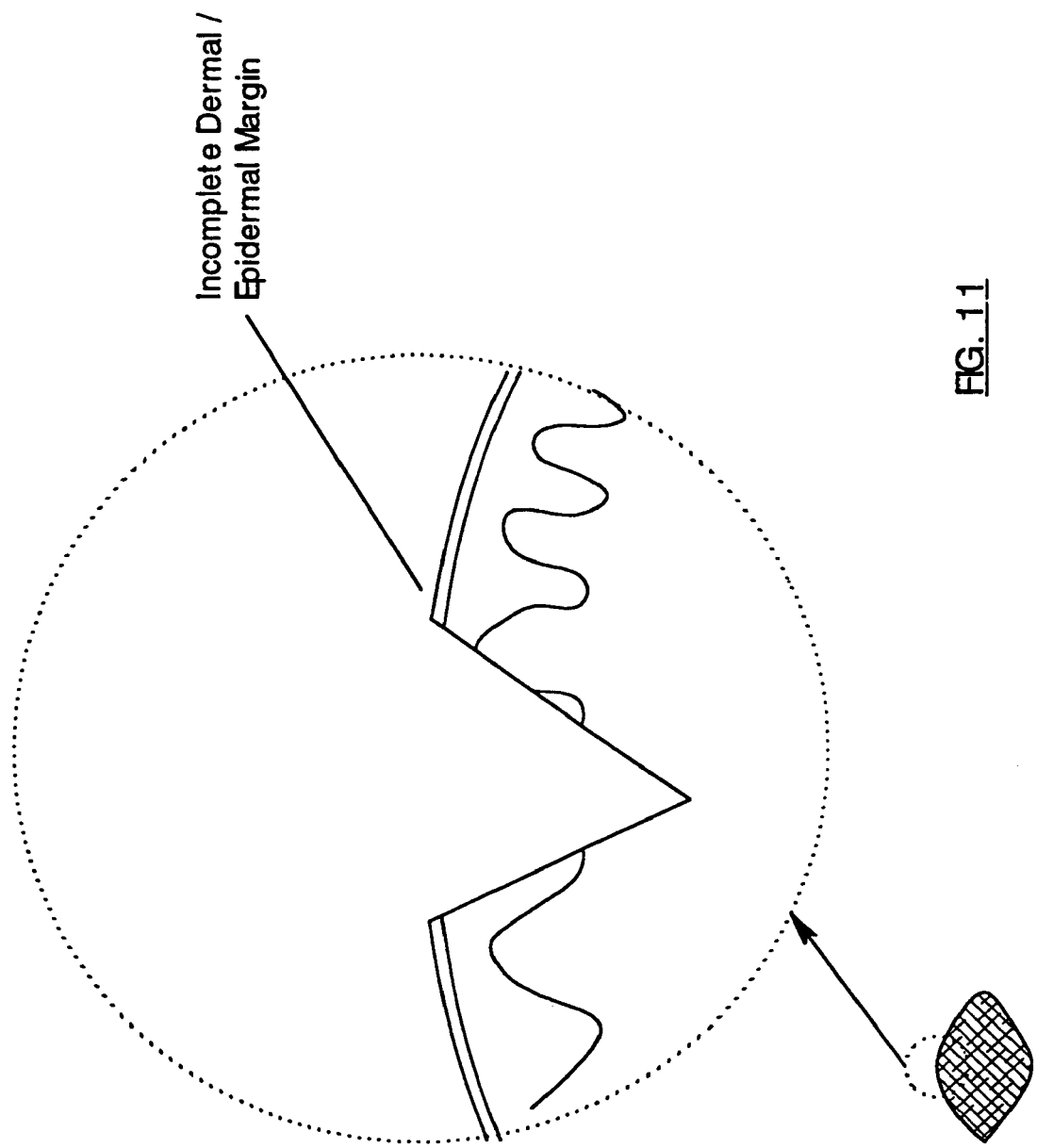

FIG. 7 is a block diagram showing the relationship between the composite macroscopic image and the specimen, and the map of the image as shown on the composite, the figure also showing a block of map elements within an image frame, the map elements being indicated on the diagram of the composite image, and the figure also showing how the block is marked by indicating the neoplasm shown therein as being cancerous, non-cancerous or uncertain or ambiguous as to its cancerous or non-cancerous nature;

FIG. 8 is a view of the composite image showing blocks which have been marked as being cancerous but flipped to reflect the orientation in the patient which is deep margin down rather than up;

FIGS. 9A, 9B and 9C constitute a diagram of the flow chart of the method carried out by the system of FIG. 1, the figures are assembled at the connectors (x) and (x) and (y) and (y);

FIG. 10 shows a complete dermal/epidermal margin and its location on the specimen; and FIG. 11 is a view similar to FIG. 10, but showing an incomplete dermal/epidermal margin.

Referring to FIG. 1, there is shown a confocal imaging system similar to the system shown in FIG. 14 of the above-referenced International Publication WO 00/49392. The system uses as its imaging means a confocal microscope 10, preferably having the polarization and acetic acid image enhancement facilities of the above-referenced International Publication WO 00/55669. The objective (objective lens 12) of the microscope is equipped with a focus control input 14, which may physically move the objective up and down to focus at a horizontal section (slice) within an excised tissue specimen in a tissue cassette 16. The cassette 16 is mounted for X and Y movement (that is in a horizontal plane), as shown by the coordinate system 18, on a translation stage 20. It may be operated by a remote control 22 which provides inputs to a controller 24 connected to the microscope 10. The controller 24 receives the reflected signal from the specimen, provides scanning signals so as to scan the specimen and create the mosaic image. Signals are provided to the stage 20 via a translator line, marked "cassette position control", and to the objective 12 via a focus control line. The laser power control for controlling the power from the laser in the microscope is indicated by the connection marked "laser power".

The controller 24 receives inputs from a computer 26 and the remote control 22. The imaging algorithms are carried out in the computer 26. The computer 26 provides serial communications over a bus for controlling the scan. It also receives a pixel clock, a line clock and a frame clock which marks the pixels individually and the lines and entire frame of the mosaic as they are contained in the reflected signal. The computer 26 creates the composite macroscopic image as well as the mosaic of map elements and stores them in memory together with their associated pointers. The image may be outputted to a network for telepathology at a remote source, or even over the Internet, via a network interface indicated at 28. Control for identifying map elements, which are to be viewed in separate frames and to switch between windows or the same window for viewing the composite and high resolution frames is obtained by user input 30 which may be implemented as a "mouse" or with a touch screen. The image is printed out on a printer 32 or may be viewed on a terminal or display 34 with the high resolution image in the center frame window and the composite image as a map in a corner window. Soft controls 36 on the display 34 are also provided for marking or for viewing different sections or slices of the specimen.

Figure 2:
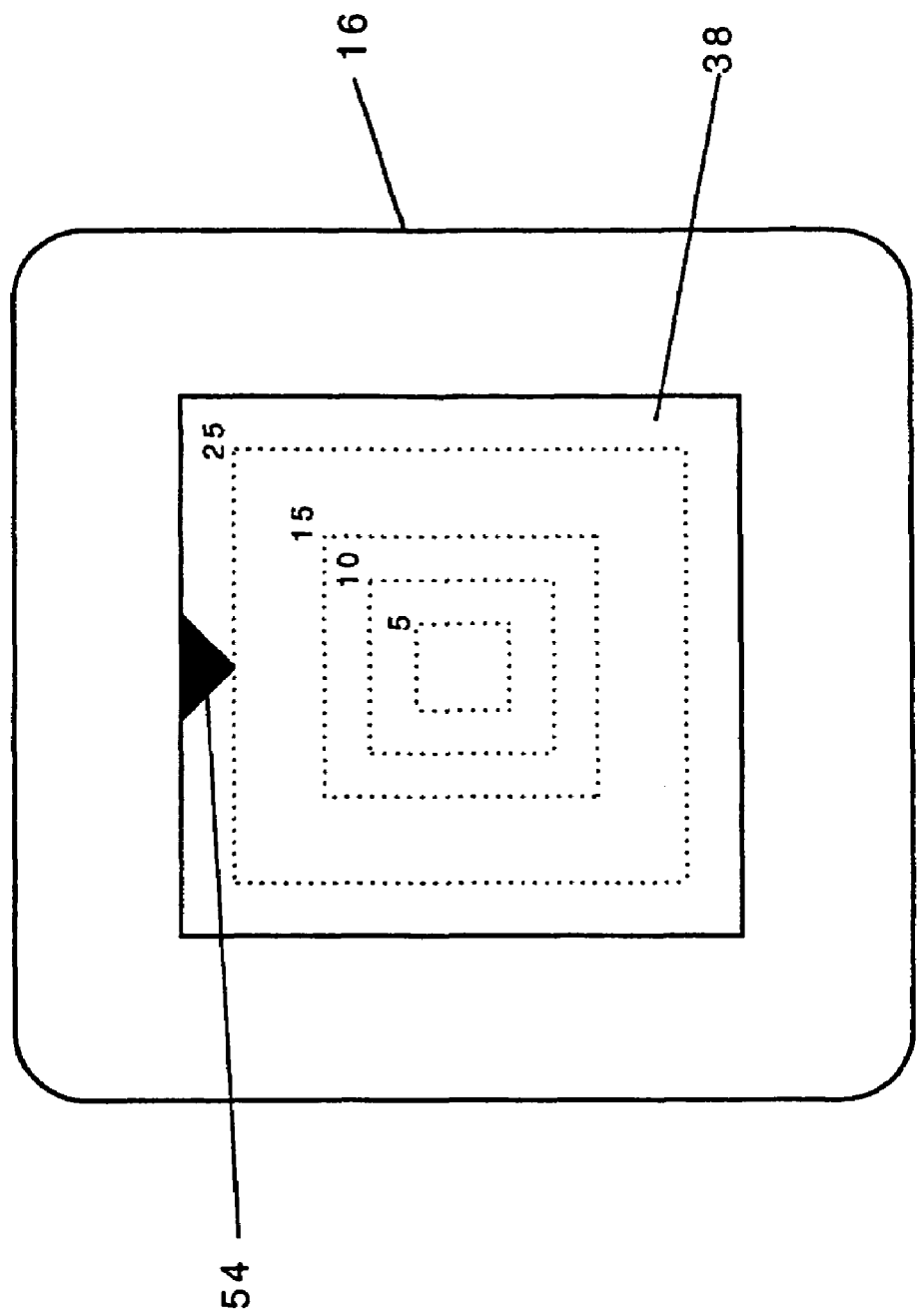
FIG. 2 is a plan view of the cassette which contains the excised tissue specimen and which is shown on a stage in FIG. 1.
Figure 3:
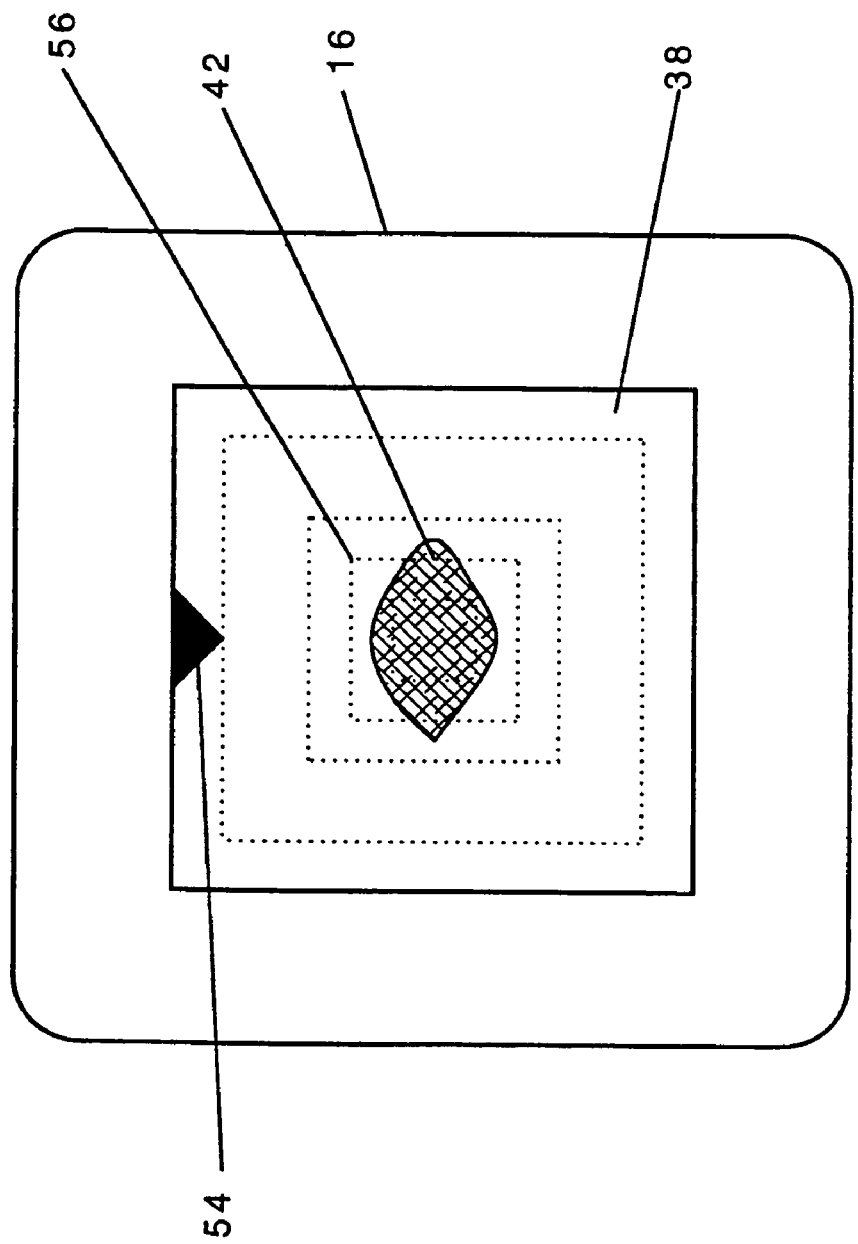
FIG. 3 is a view similar to FIG. 2, but with the specimen mounted in the cassette with the deep margin up, the deep margin being oriented to face the objective of the confocal imaging system.
Figure 4:
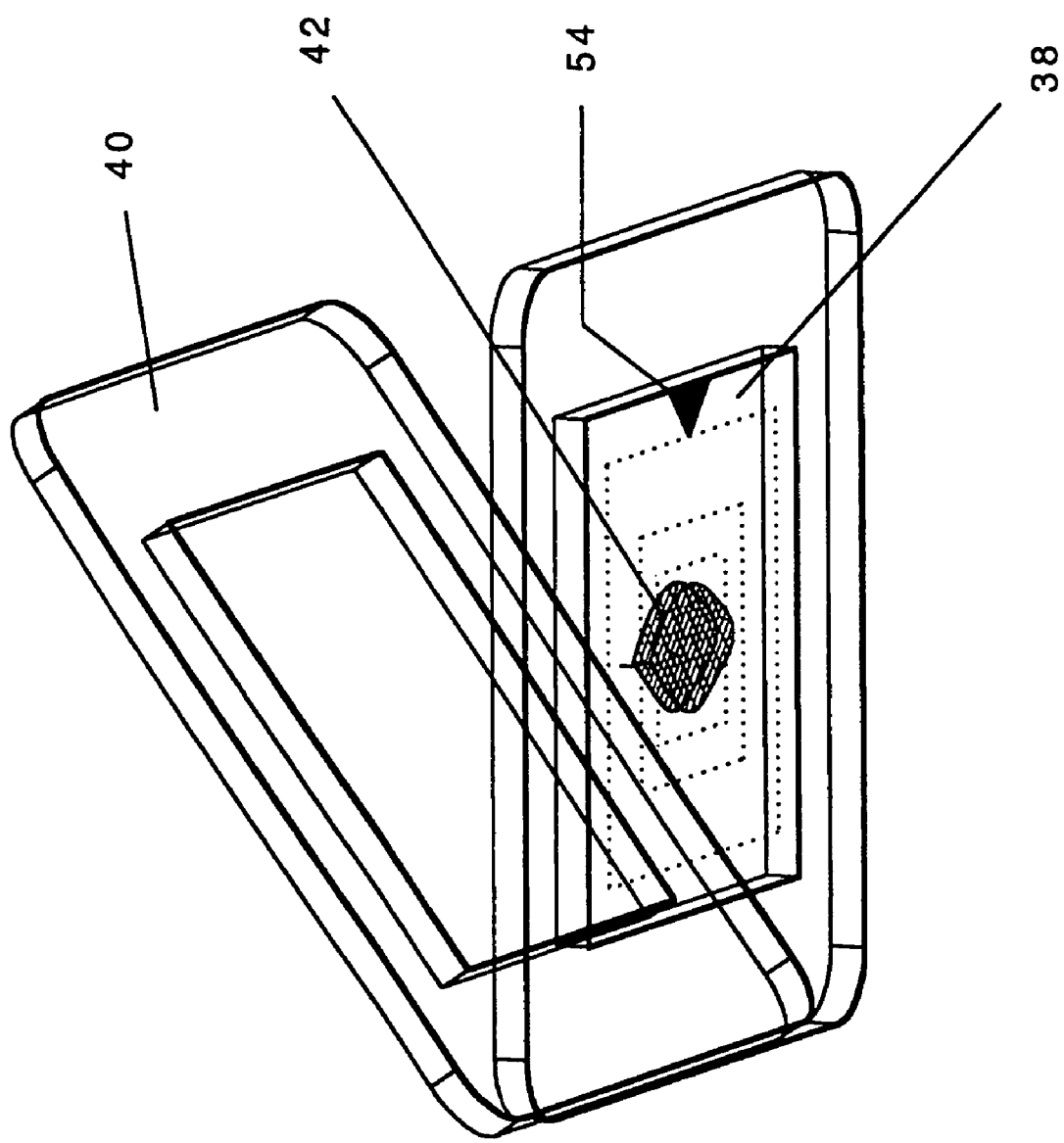
FIG. 4 is a perspective view of the cassette showing the lid of the cassette down with the cassette cover being closed, the cassette cover being the portion of the cassette adjacent to the objective lens in FIG. 1, and the specimen being placed on the lid in the center thereof, and the cassette cover, which contains a plate or window which compresses the specimen, in the open position.

FIG. 2 shows the bottom or lid of the cassette 16. It shows a mark 54 at the top which indicates the head or top center of the head (superior margin) of the patient. There are marks 56 or blocks indicating five, ten, fifteen and twenty millimeter regions all concentric with each other, as shown in FIG. 3. The cassette 16, as shown in FIG. 4, has a lid 38 and a cover plate 40 which when closed compresses the specimen 42.

Figure 5:
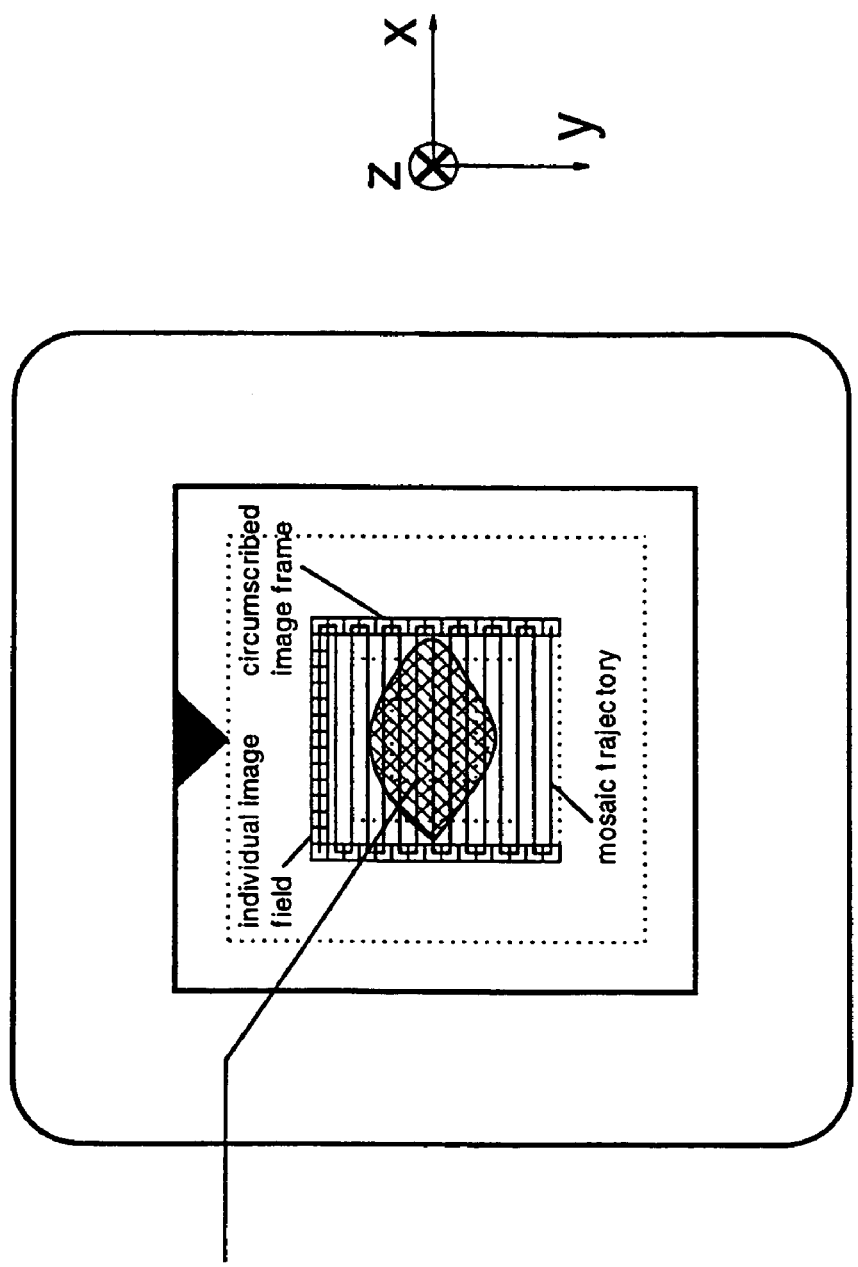
FIG. 5 is a showing of the serpentine path of the scan, the raster across the specimen and individual elements which make up the mosaic of elements of the high resolution or mosaic image.
Figure 6:
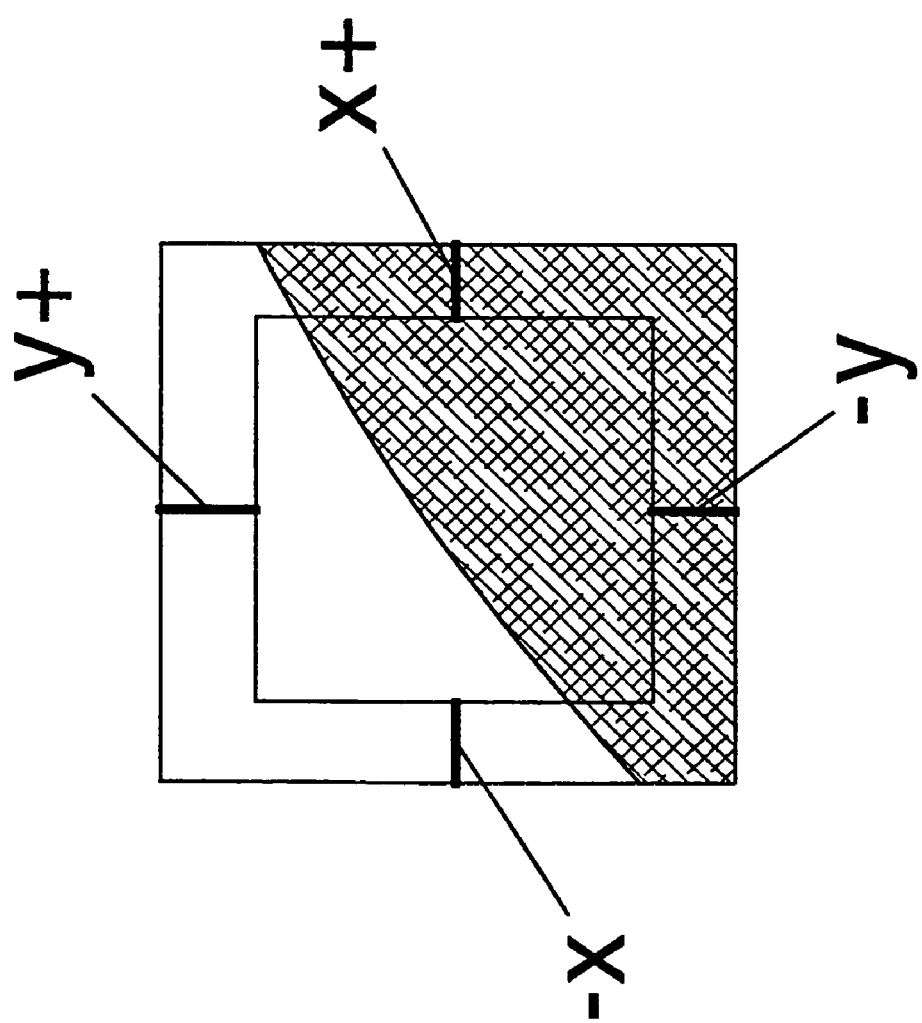
FIG. 6 is a view showing the clipping limits or vignetted part of an image elements from which an image of the element is taken so as to remove blurring or reduce intensity at the image margins.

FIG. 5 shows the mosaic of individual image fields or map elements which are created by scanning in X and Y step wise across a region which contains the specimen 42. The scan is called the "mosaic trajectory". Only the individual map elements or image fields across the first or top traverse of the scan are shown to simplify the illustration. In processing the image the signals may be limited at boundaries Y and X so as to vignette the image thereby removing areas at the boundary which may not be unambiguously digitized in the computer, as shown in FIG. 6.

In one embodiment, the controller 24 which receives the reflected signals (either gray scale or in color of the tissue) determines a continuous outer boundary of the tissue shown in the image by first thresholding each of the pixels of the image. The pixels above the threshold are stored as "1s" in a bit map, while all other bits are stored as "0". The area of the bit map is divided into the blocks shown as the individual image fields in FIG. 5. The area of these blocks may constitute 80% to 100% of the field of view of the confocal imaging system, which may be from 0.4 to 1.0 millimeters. An "exclusive-or" operation may be performed in the controller on the bits of each block of the bit map, which if the operation results in a "1" for any block, identifies that block as being contained inside the boundary line of the tissue against the window. The bit map forms a map of the tissue in contact with the window or other horizontal slices further away from the window (in the z direction).

An example of the information displayed on the display 34, for a particular case, is illustrated in FIG. 7.

The mosaic may be 15 by 15 individual image blocks or frames, where each frame is stored as 640 by 640 pixels. For example, a mosaic is shown at 50 in FIG. 7.

The region containing four image blocks or map elements is selected, via the controls by viewing the macroscopic image. The region is enlarged and shown at 58, displays in high resolution four blocks of the image mosaic. From this high resolution image the cancerous cells can be detected by the physician (the pathologist) who observes the confocal image on the display 34 or on a display which is coupled via the network 28. Then the neoplastic condition can be identified by using the controls 36 and marked on the display or map in different patterns or colors; red for cancerous, green for non-cancerous and yellow for uncertain. Image maps shown at 55, 52, and 57 in FIG. 7 are marked cancerous, non-cancerous and uncertain, respectively. It will therefore be apparent that there is a complete anatomical map of the specimen, as well as images of sufficient resolution to detect cells which are neoplastic.

It may be desirable to flip the image 180 degrees to reflect the orientation of the patient; that is deep margin down, rather than up, as the image is actually mounted in the cassette and viewed by the confocal microscope 10 (see FIG. 1). The flipped composite image with cancerous areas marked is shown in FIG. 8. This image serves as a tumor map and can be used to guide subsequent excisions.

Referring to FIGS. 9A, 9B and 9C, the method and algorithm for carrying out the invention is illustrated. FIG. 9A illustrates the tissue loading and imaging phase, while FIGS. 9B and 9C illustrate the image formation and display phase, respectively.

First the tissue is excised from the patient in the step of removing the tissue 60. The tissue is marked to indicate the tissue orientation with respect to the patient by the physician. That is, the superior margin toward the head of the patient is important as well as the lateral or sides of the excise specimen. This step is shown at 62. The tissue specimen is then placed on the lid 38 of the cassette 16 with the deep margin facing up, as shown in FIGS. 3 and 4. The superior margin faces the indicia 54. This step is shown at 64.

The specimen is placed on the lid 38 inside the marked grid of the lid. The cassette cover then is closed and imaging fluid, for example the acetic acid, is inserted into the cassette around the specimen. This step is shown at 66.

The user inputs the size of the largest grid which circumscribes the specimen. This is the grid 56 shown in FIG. 3. This provides a tissue size input which is used in creating the mosaic of map elements as shown in FIG. 5. The size of marking step is indicated at 68. The specimen in its cassette 16 is then mounted on the stage by placing it on the receptacle indicated at 55 in FIG. 1. The loading step is shown at 70.

The remaining steps of algorithm and the operations to obtain the image are apparent from FIGS. 9B and 9C. The X, Y and Z parameters of the map are inputted automatically from the controller at 80. The translator (translation stage) position which corresponds to the center of the cassette is programmed into the controller, initially. The focus is then adjusted by the user to obtain the slice or depth (in z) of interest for the particular image at 82, such as with focus control input 14. The stage is then sent home to a start location at 84. The serpentine scan is then carried out at 86. Each map element is then stored in memory. Since there are many bits, disk memory may be used. See 88. The clipping or vignetting of the image step is next carried out at 90. Then the composite or macro image is obtained either by pixel elimination, mean value substitution or median filtering and saved in bit map, DICOM format or similar format at 92. At 94 the composite is displayed, this may be in the main window or in the side window on display 34. The user then clicks with the mouse on the composite to a desired X, Y location and the four map elements at the X, Y location are displayed in the main window. This is step 96. In this manner, the four map elements provide a high resolution image to the user which was stored in memory at step 88. Optionally, the user may select to view live images of the specimen in a window on the display with the confocal microscope imaging of specimen at a desired X-Y location, and the user may manipulate imaging, such as by changing focus (depth) or laser power of the confocal microscope, or may move the translation stage with respect to the objective lens of the confocal microscope about that X-Y location. The pathologist then marks the image as a mapped section of the specimen which has cancerous cells. The margins of the specimen are thoroughly investigated and all cancerous regions marked for further excision and removal during the latter stages of the surgery. The marking step is shown at 96A. If a map button is clicked on the display 34, the composite map is again displayed at step 94, and steps 96 and 96A may be repeated at the same or different X-Y location on the composite map. The mapping described above may be reactivated (repeated) for the specimen if any setting of the confocal microscope, such as focus, laser power, or other imaging parameter, is changed at step 98A. After the specimen is examined, a complete two-dimensional image with the markings and the composite map all oriented with respect to the patient may be outputted to the display 34 or color printer 32.

An important aspect of Moh's surgery is that the entire margin of the specimen is imaged. FIG. 10 shows a complete dermal/epidermal margin. The corrugated line in FIG. 10 represents the interface between the epidermal layer and the dermal layer. FIG. 11 shows an incomplete dermal/epidermal junction. The cause for an incomplete junction is due to tissue lifting from the imaging window 40. If the physician were to see image blocks as shown in the expanded region of FIG. 11, the physician should mark the region as "uncertain" and investigate the area with live images focusing higher into the tissue until the entire boundary is imaged. This insures that a projection of cancer has not evaded detection.

From the foregoing description it will be apparent that there has been provided an improved system for sectioning and mapping surgically excised tissues via confocal microscopy so as to obtain macro displays suitable for marking and micro displays corresponding to specific sections of the macro display, from which the nature of the tissue can be determined on a microscopic level. Complete anatomical maps may be provided or the images may be viewed in live form, as is conventional in confocal microscopy, thereby providing the pathologist with extreme flexibility in carrying out histopathological examinations and especially detecting cancers. In the preferred embodiment confocal reflectance microscopy is used to provide images with sufficient resolution in order to allow pathological screening or diagnosis. Other imaging modalities could be substituted for the reflectance confocal microscope. Examples of alternative imaging modalities include, optical coherence tomography, multiphoton microscopy or high frequency ultrasound. In-vivo mapping of the lesion is also possible by using an in-vivo reflectance confocal microscope to image the surgical field rather than an excised specimen. These and other variations and modifications in the herein described system will undoubtedly become apparent to those skilled in the art. Accordingly, the foregoing description should be taken as illustrative and not in a limiting sense.

The invention claimed is:

1. A system for optically sectioning and mapping a surgically excised tissue specimen comprising:
    means for providing data representing a mosaic of optically formed sectional image elements of the specimen, wherein each of said sectional image elements has a field of view representing a plurality of pixels; and
    means for viewing on a display at a first resolution a macroscopic composite image of the specimen in accordance with said data representing said mosaic of optically formed sectional image elements; and
    means for selecting at least one location on the macroscopic composite image for enabling viewing by said viewing means of the sectional image elements associated with said location on said display at a second resolution higher than said first resolution, in which said macroscopic composite image exceeds the field of view of each of said sectional elements.

2. The system according to claim 1 further comprising means for providing anatomical maps of the specimen with areas containing cells which are cancerous marked to direct further surgical operations.

3. The system according to claim 1 wherein said data providing means comprises a laser scanning confocal microscope.

4. The system according to claim 1 wherein said data providing means comprises means for providing data respecting a plurality of said optically formed sectional images each corresponding to a different slice of said specimen, and said viewing means is operative to view a composite image and microscopic images of each of said slices.

5. The system according to claim 4 wherein said data providing means comprises means for scanning said specimen and providing said mosaic on each said slices during each of a plurality of scans.

6. The system according to claim 1 wherein said viewing means provided on said display said macroscopic composite image as a plurality of frames arranged according to said mosaic in which each of said frames represents at least one of said sectional image elements.

7. The system according to claim 3 wherein said confocal microscope has a stage, a cassette removably containing said specimen mounted on said stage and an objective lens, said lens and stage being movable with respect to each other along X-Y-Z coordinates during said mapping.

8. The system according to claim 1 wherein said data providing means comprises means providing data representing the orientation of said specimen with respect to a patient from which said specimen is excised.

9. A method of optically sectioning and mapping tissue for histopathology comprising the steps of:
    capturing an anatomic map of optically formed sectional image elements constituting a full field representation of a region of said tissue which constitutes a specimen, in which each of said sectional image elements has a field of view of said tissue;
    storing data representing a plurality of pixels constituting each of said map elements and orientation of said specimen with respect to a patient;
    displaying in response to said data a composite macroscopic image of said full field containing all of said pixels at a first resolution, in which said composite macroscopic image of said full field exceeds the field of view of each of said sectional image elements; and
    displaying microscopic images of selected blocks of said elements of sufficient higher resolution than said first resolution to show portions of said specimen containing cells of interest.

10. The method according to claim 9 wherein said capturing step is carried out with the aid of a laser confocal microscope while scanning said specimen in a plurality of planes thereby providing a plurality of composite images and high resolution microscopic images for each of said composite images.

11. The method according to claim 9 further comprising the step of marking areas of said composite image corresponding to said blocks to indicate the histopathological characteristics of said blocks apparent from the microscopic images thereof.

12. A system for optically sectioning and mapping tissue excised from a patient comprising:
    means for capturing microscopic images of optically formed sections of the tissue;
    means for presenting different parts of said tissue to said capturing means while maintaining the orientation of said tissue with respect to the patient from which said tissue was excised, operating said capturing means to capture at least one microscopic image of section of said tissue at each of said different parts of said tissue, and storing each of said captured microscopic images;
    means for providing a macroscopic composite image of said specimen in accordance with a plurality of different ones of said stored microscopic images the specimen; and
    means for displaying said composite image at a resolution to enable selection of one or more locations in said composite image and displaying at least one of said stored microscopic image associated with each said selected location at a higher resolution than the resolution of said displayed composite image, in which said macroscopic image exceeds the field of view of any one of said microscopic images.

13. The system according to claim 12 wherein said capturing means is operative by one of confocal microscopy, optical coherence tomography, multi-photon microscopy, or high frequency ultrasound.

14. The system according to claim 12 further comprising means for enabling a user to mark one or more of said selected locations of said composite image indicating histopathological characteristics.

15. The system according to claim 12 wherein said presenting means comprises:
    a translation stage; and
    means for mounting said tissue on said translation stage to present said tissue to said capturing means while maintaining the orientation of said tissue with respect to the patient from which said tissue was excised.

16. The system according to claim 15 wherein said mounting means is provided by a cassette containing said tissue located on said translation stage.

17. The system according to claim 12 wherein said composite image provides a map of the tissue and one or more of said microscopic images have sufficient resolution to show cells which are neoplastic.

18. The system according to claim 12 wherein said composite image provides a map to guide subsequent excisions in the patient.

19. The system according to claim 12 wherein said composite image is capable of being reoriented 180 degrees.

20. The system according to claim 12 wherein said means for displaying said composite image to enable selection of one or more locations in said composite image further comprises means for enabling a user to view live microscopic images captured by said capturing means at each said selected location, and to control imaging parameters of said capturing means to effect said live microscopic images captured.

21. The system according to claim 12 wherein said means for displaying said composite image to enable selection of one or more locations in said composite image further comprises means for enabling a user to view live microscopic images captured by said capturing means at each said selected location and to select the part of said tissue in said live microscopic images being presented to said capturing means.

22. The method according to claim 9 wherein said capturing step is carried out by one of confocal microscopy, optical coherence tomography, multi-photon microscopy, or high frequency ultrasound.

23. The method according to claim 9 wherein said capturing step is carried out by one of optical coherence tomography or multi-photon microscopy.

24. A system for mapping tissue comprising:

an imager for capturing first data representing a mosaic of optically formed sectional microscopic images of the tissue; and a computer system receiving said first data from said imager, and said computer system having memory storing at least second data representing a macroscopic image of said tissue in accordance with said first data, in which said macroscopic image has a field of view of said tissue greater in size than any one of said microscopic images, and said macroscopic image is displayable at a different resolution than said microscopic images.

25. The system according to claim 24 wherein said imager is operative by confocal microscopy.

26. The system according to claim 24 wherein said imager is operative by optical coherence tomography or multiphoton microscopy.

27. The system according to claim 24 wherein said imager is operative by high frequency ultrasound.

28. The system according to claim 1 wherein said means further comprises means for enabling a user to identify the presence or absence of cancer in one or more of said sectional elements of the mosaic.

29. The method according to claim 9 further comprising the step of determining the presence or absence of cancer in one or more of said displayed microscopic images.

30. The system according to claim 1 wherein said viewing means further comprising viewing on said display said selected elements.

31. The system according to claim 1 wherein said means for providing data representing a mosaic of optically formed sectional image elements comprises means for automatically scanning an area of said excised tissue specimen to provide multiple sectional image elements on or within said excised tissue specimen, wherein said area exceeds the field of view of any one of said sectional image elements.

32. The system according to claim 31 wherein said automatically scanning of said area of said excised tissue specimen is at a user selected depth.

* * * * *